United States Patent [19]

Klein

[11] 4,212,782

[45] Jul. 15, 1980

[54] POLYMERS OF ACID ADDITION SALTS OF METHACRYLIC ACID AND A 2-MONO(LOWER)ALKYLAMINOETHYL METHACRYLATE

[75] Inventor: Max Klein, Tinton Falls, N.J.

[73] Assignee: Normac, Inc., Tinton Falls, N.J.

[21] Appl. No.: 903,566

[22] Filed: May 8, 1978

Related U.S. Application Data

[63] Continuation of Ser. No. 674,990, Apr. 8, 1976, which is a continuation-in-part of Ser. No. 413,043, Nov. 5, 1973, Pat. No. 3,950,398, which is a continuation-in-part of Ser. No. 15,935, Mar. 2, 1970, abandoned, which is a continuation-in-part of Ser. No. 488,756, Sep. 20, 1965, abandoned.

[51] Int. Cl.$^2$ .................... C08F 4/04; C08K 5/19; C08F 2/28; C08F 18/22
[52] U.S. Cl. .................... 260/29.6 HN; 210/54; 260/29.6 R; 260/29.6 TA; 260/29.6 H; 260/30.4 EP; 525/113; 526/75; 526/93; 526/201; 526/218; 526/240; 526/292; 526/903; 526/911; 526/923
[58] Field of Search .............. 526/923, 292, 312, 75; 260/29.6 H, 29.6 TA, 29.6 HN, 29.6 RW

[56] References Cited

U.S. PATENT DOCUMENTS

| | | | |
|---|---|---|---|
| 2,138,762 | 11/1938 | Harmon | 526/312 |
| 3,099,636 | 7/1963 | Skiles | 526/312 |
| 3,239,496 | 3/1966 | Jurisch | 526/312 |

*Primary Examiner*—Joseph L. Schofer
*Assistant Examiner*—Herbert J. Lilling
*Attorney, Agent, or Firm*—A. A. Orlinger

[57] ABSTRACT

Disclosed are solid, readily water-soluble addition polymers of acid addition salts of methacrylic acid and a 2-mono(lower)alkylaminoethyl methacrylate, whose lower alkyl group has up to 6 carbons and is straight or branched chain or cyclic. These polymers are insoluble in pentane, hexane and butane below their boiling points, and their aqueous solutions show amphoteric activity. These polymers result from polymerizing the starting monomeric acid addition salt of methacrylic acid and a 2-mono(lower)alkylaminoethyl methacrylate in the ratio of from about one mol to about 1.5 mols of one of them per mol of the other. Also disclosed is the method of producing these addition polymers by heating the starting acid addition salt under pressure in a low boiling aliphatic solvent at a temperature above its boiling point, from which after lowering the temperature the resulting addition polymer readily is separated as a light weight finely divided product.

26 Claims, No Drawings

POLYMERS OF ACID ADDITION SALTS OF METHACRYLIC ACID AND A 2-MONO(LOWER)ALKYLAMINOETHYL METHACRYLATE

This application is a continuation of copending application Ser. No. 674,990 filed Apr. 8, 1976, which then was copending with and is a continuation-in-part of my copending application Ser. No. 413,043 filed Nov. 5, 1973 (now U.S. Pat. No. 3,950,398 on subject matter not claimed in this application), which then was copending with and is a continuation-in-part of my application Ser. No. 015,935 filed Mar. 2, 1970 (now abandoned), which in turn is a continuation-in-part of my then copending with it application Ser. No. 488,756 filed Sept. 20, 1965 and now abandoned.

This invention is that of certain solid, readily water-soluble addition polymers of a water-soluble acid addition salt of methacrylic acid and a 2-mono(lower)alkylaminoethyl methacrylate whose lower alkyl group has up to six carbons and is straight or branched chain or cyclic. The addition polymer of the invention includes the methacrylic acid and the mono-alkylaminoethyl moieties (i) linked to one another by addition at the respectively original vinyl group of each of them and (ii) present in the ratio of from about one mol to about 1.5 mols of one of them per mol of the other.

These polymers (i) are insoluble in pentane, hexane, or butane at below their boiling points, (ii) in aqueous media manifest amphoteric activity, and (iii) resist fusion at elevated temperature up to at least about 315° C.

The 2-mono(lower)alkylaminoethyl methacrylate sometimes broadly briefly is called the "secondary-aminoethyl methacrylate" or at times more briefly simply the "secondary-aminoethyl ester".

Due to their polyamphoteric character the addition polymers of the invention, for example, the addition polymers of an equimolar acid addition salt, are useful in sequestration of a polyvalent metal cation, such as the ferric ion, over a wide pH range as at pH 11 to as low as at pH 2, and even in the presence of sea water. Similar utility as in enhancing the corrosion resistance of iron, can be found in the addition polymers of the invention, wherein the ratio of the methacrylic acid moiety to that of the secondary-aminoethyl methacrylate differs from one to one.

Other utilities of the various addition polymers of the invention include the enhancement of the extent of conversion of styrene to polystyrene in the emulsion polymerization of styrene.

Useful aqueous solutions of the addition polymers of the invention are prepared, for example, directly by polymerizing the selected applicable starting polymerizable acid addition salt (of methacrylic acid and a secondary-aminoethyl methacrylate) at elevated temperature (till the polymerization is substantially complete) in an aqueous medium, e.g. with the selected salt dissolved in water.

The addition polymers of the invention can be obtained as a light weight finely divided end product by polymerizing the selected starting polymerizable acid addition salt in any of the above-mentioned low boiling aliphatic hydrocarbon solvents, e.g. especially pentane, at elevated temperature above its boiling point and so also under pressure to yield a water-soluble polymer which precipitates in easily separable light weight finely divided solid state.

Specifically these starting materials polymerizable water-soluble solid acid addition salts products as solid composition comprise the acid addition salt of equimolar parts of methacrylic acid and any aforesaid secondary-aminoethyl methacrylate, which addition salt as such solid product contains from none to about 50% molar excess of either the methacrylic acid or said mono-alkylaminoethyl methacrylate component.

An important subgenus of these solid starting materials is the acid addition salt of substantially stoichiometrically equivalent or equimolar quantities of its methacrylic acid and mono-alkylaminoethyl methacrylate components. This type of embodiment of the acid addition salts of the invention briefly is called "the equimolar acid addition salts" of methacrylic acid and the 2-mono(lower)alkylaminoethyl methacrylate, or singly may be called "an equimolar acid addition salt" of this acid and the particular secondary-aminoethyl methacrylate component.

The expression "component" used herein in referring to a part of an acid addition salt starting material means that part of the acid addition salt present in it from the respective one of the starting reactants, namely, the methacrylic acid or the specific secondary-aminoethyl ester, from which the particular acid addition walt was made.

Another subgenus of the acid addition salts starting material is that of those solid acid addition salts obtained from admixing methacrylic acid and the 2-mono(lower)alkylaminoethyl methacrylate in other than equimolar proportions, that is to say, in unequal molar proportions, with an excess of either one of them over the other even up to as much as about 50 mol percent and possibly more. This type of the solid salts starting material conveniently are called briefly the "unequal-molar acid addition salts".

Accordingly, such unequal-molar acid addition salt having an excess of methacrylic acid conveniently briefly is called the "excess-acid unequal-molar acid addition salt". Alternatively, the unequal-molar salt having an excess of the 2-mono(lower)alkylaminoethyl methacrylate component similarly conveniently is called briefly the "excess-ester unequal-molar acid addition salt". In either case, each of these types of unequal-molar acid addition salts is a water-soluble, waxy-appearing yet readily frangible, uniform-looking solid.

The preparation and handling of these various types of the starting material acid addition salts, as well as certain of their uses, are fully described in U.S. Pat. No. 3,950,398 issued Apr. 13, 1976 (on my then copending application Ser. No. 413,043) at its column 2 line 33 to column 10 line 55, all inclusive of which are incorporated herein in full by reference so as to be an actual part of this specification as if they are written out in full herein.

The method of preparing the polymers of this invention and the polymers themselves are illustrated by, but not restricted to, the following:

EXAMPLE 1

Polymerization product of equimolar acid addition salt

Thirty-six grams of the equimolar acid addition salt of glacial methacrylic acid and 2-(mono-tertiary-butylamino)ethyl methacrylate of Example 1 of that U.S. Pat. No. 3,950,398, and 115 grams of pentane, together with 0.2 gram of the alpha, alpha'-azo-bis-isobutyronitrile as catalyst were loaded into a seven ounce heavy-walled, narrow-necked glass pressure-bottle and pressure-tightly sealed therein by an aluminum inner-lined cork insert metal cap mechanically secured by pressure crimping to the bottle neck.

The sealed polymerization pressure-bottle was mounted for rotation at 40 r.p.m. about an axis normal to its longitudinal axis and intermediate its ends in a temperature-controlled water-bath. When the bath temperature reached 130° F. (55° C.), the acid addition salt was noted to have dissolved in the pentane. The heating was continued until the bath reached 150° F. (85.6° C.) and the rotation continued with the bath maintained at it when the polymerization was complete at the end of a 24 hour cycle at 150° F.

This equimolar acid addition salt polymer formed as a very finely divided white solid suspension in the pentane, in which it was insoluble. This polymer was filtered off easily from the pentane and dried readily at room temperature and pressure as the entrained pentane evaporated off, leaving behind the extremely finely divided polymeric product. This product was so fine that it floated upwardly out of a jar in which it was kept, upon removing the cover of the jar.

This white powder resisted fusion at observed temperatures up to 600° F. (315.6° C.). At about 700° F. (371° C.) it discolored and softened, and exposed to the air at that level after 5 minutes it turned brown and assumed a rubbery character.

This finely divided equimolar acid addition salt polymer dissolved in water readily at all concentrations up to 50 percent (the highest tried). The 50% aqueous solution was clear and quite viscous. Evaporation of the water from a coating of its aqueous solution on paper, glass, and other surfaces left a water-white, tough and flexible film, which also is transparent.

The polyamphoteric character of this equimolar acid addition salt polymer is shown by the typical dual peaks (one on the acid side and the other on the alkaline) separated by the trough between them—on plotting its viscosity versus pH.

This polyamphoteric equimolar acid addition salt polymer also manifests sequestration effectiveness. For example, immersion of 0.5 gram of steel wool in a 1% aqueous solution of this polymer withstood precipitation of any iron oxide at from ambient temperature even to heating at 150° F. (65.6° C.) for a couple of hours and then showed only a yellowish to amber clear solution. On the other hand, the control sample (without any dissolved polymer) showed a brownish precipitate within 2 hours at 150° F. (65.6° C.).

Addition of sodium hydroxide to pH 11 produced no precipitate in the aqueous sample containing 1% of the equimolar acid addition salt polymer with the immersed steel wool. Addition of hydrochloric acid to give pH 2 to 100 ml. of the 1% aqueous solution of the polymer with 0.5 gram of steel wool immersed in it after 10 days showed only a slight yellowish discoloration and no precipitate. In the control sample which contained no polymerized equimolar acid addition salt, the steel wool was completely dissolved in 4 days.

A jar of sea water with a steel nail immersed in it showed a brownish precipitate of iron oxide within 4 hours. Yet a similar jar with 1% of this polymerized acid addition salt dissolved in the sea water remained stable without change over a test period extended to 3 months.

Repeating Example 1 by only replacing its 2-(mono-tertiary-butylamino)ethyl methacrylate separately by the same molar quantity of each of the other acid addition salts of methacrylic acid and a 2-mono(lower)alkylaminoethyl methacrylate with the lower alkyl group having up to six carbon atoms and being straight or branched chain or cyclic, namely, 2-(mono)methylaminoethyl methacrylate, 2-(mono)ethylaminoethyl methacrylate, 2-(mono)propylaminoethyl methacrylate, 2-(mono)isopropylaminoethyl methacrylate, 2-(mono)n-amylaminoethyl methacrylate, 2-(mono)isoamylaminoethyl methacrylate, and 2-(mono)hexylaminoethyl methacrylate respectively provides in the same way the corresponding addition polymer (of this invention) of the equimolar addition salt of methacrylic acid and each of these just above-named 2-mono(lower)alkylaminoethyl methacrylates separately respectively.

Similarly repeating Example 1 only by replacing its 2-(mono-tertiary-butylamino)ethyl methacrylate separately by the same molar quantity of first each separate one respectively of the above referred to excess acid addition salts and likewise of each separate one respectively of the above referred to excess ester addition salts, each as above incorporated herein by reference, provides in the same way the corresponding addition polymer (of this invention) of the separate just earlier above noted unequal molar acid addition salts respectively.

Each of these further examples of the various addition polymers of this invention said in the just immediately preceding two paragraphs to be provided by repeating Example 1 with the respectively described replacement of the starting acid addition salt is to be considered as if it is written out in full herein (so as to avoid unnecessarily extending the disclosure).

This addition polymer of the invention also shows utility to enhance the effectiveness of dissolved ferric ion in the redox formulation for emulsion polymerization, as with styrene; as illustrated by, but not restricted to, the following:

EXAMPLE 2

Comparison in emulsion polymerization (A) 120 ml. of commercial spring water, 1.5 grams of the addition polymer of Example 1 hereof (briefly called Example 1 polyampholyte), 0.4 gram each of ammonium persulfate and of sodium metabisulfite, 2 grams of ferrous sulfate solution (of 0.3 gram ferrous sulfate per 100 ml. water), and 60 grams of styrene (monomer) were loaded into an 8 ounce pressure bottle like the one described in said Example 1.

(B) Another such bottle was prepared with the same content except that 0.5 gram of its Example 1 polyampholyte was replaced by 0.5 gram of a commercial soap (Procter & Gamble's 'Ivory Snow' product).

(C) A third such bottle was prepared with the entire 1.5 grams of the polyampholyte of part (A) replaced by 1.5 grams of that 'Ivory Snow' commercial soap.

All of the three bottles were mounted just as was the pressure-bottle of Example 1 and rotated at the same time in the water-bath maintained at 120° F. for three hours. These bottles then were allowed to cool, and the respective following percentages of conversion of the styrene to polystyrene were determined:

| A. | polyampholyte 1.5 gm. | 100%; |
| B. | polyampholyte 1. gm. | 55.4%; and |

| | -continued | |
|---|---|---|
| | 'Ivory Snow' 0.5 gm. | |
| C. | 'Ivory Snow' 1.5 gm. | 48%. |

These results show that the Example 1 polyampholyte so enhanced the emulsion polymerization of styrene so as to provide complete conversion to polystyrene in the period in which the other two emulsification agents allowed only 55.4% and 48% conversion respectively.

U.S. Pat. No. 3,950,398 (column 8 lines 7–30) states that the unequal acid addition salts which it discloses manifest certain anti-corrosion activity. For example, on dissolving methacrylic acid in water having steel wool immersed in it, the characteristic bubbling occurs at the steel wool surfaces from the hydrogen evolution following attack on the steel wool by that acid. However, no bubbling occurs when steel wool is immersed (and even agitated) in water when either the excess acid or the excess-ester unequal acid addition salt is dissolved in the water.

Also, when 1 gram of steel wool was immersed in 50 ml. of water, rust developed in 4 hours. Then too, when 1 gram of steel wool was immersed in 50 ml. of water containing dissolved separately 0.5 gram of glacial methacrylic acid or mono-(tertiary)butylaminoethyl methacrylate the solution turned light tan within 12 hours. However, when the water contained dissolved in it instead of 0.5 gram of either the 50% excess-acid or excess-ester acid addition salt of U.S. Pat. No. 3,950,398 Examples 2(e) (of its column 6 lines 5–9) or 3(v) (same patent column 6 lines 38–43) respectively separately, the solution was still clear even beyond at least 24 hours so far as then presently tested. Then too, there was no evolution of gas from the immersion of the steel wool in the solution of the excess-acid addition salt.

The advantageous feature stemming from the unobvious property of the equimolar acid addition salt of the invention to provide the possibility of solution co-polymerization of some polymerizable monomers, such as styrene and acrylonitrile, which when sought to be copolymerized in solution otherwise are prone to yield undesirably low viscosity polymer solutions giving weak and brittle films cast therefrom, is illustrated by, but not restricted to, the following examples.

EXAMPLE 3

Solution co-polymerization of styrene and acrylonitrile with equimolar acid addition salt 120 ml. of styrene, 28 ml. of acrylonitrile, 200 ml. of methyl ethyl ketone, 180 ml. of xylene, 3 ml. of tricresyl phosphate, and 3 ml. of butyl benzyl phthallate were mixed in a liter beaker, and into their mixture 0.6 gram of alpha, alpha'-azo-bis-isobutyronitrile and 0.02 gram of benzoyl peroxide were uniformly admixed.

Seven grams of the finely divided equimolar acid addition salt of U.S. Pat. No. 3,950,348 Example 1 were placed in a stainless steel pressure reactor, to which was added 225 ml. of the just described solution of the monomers styrene and acrylonitrile in the solvents methyl ethyl ketone and xylene, with the included phosphate and phthallate plasticizers and the nitrile and peroxide catalyst.

The reactor was sealed with its cap screwed pressure-tightly over the outside threads of its neck with a teflon-tape seal between the cap and the threads. The reactor was rotated about its own axis in a water bath maintained at 160° F. (70.1° C.), for 16 hours to obtain substantially complete conversion.

The resulting styrene-acrylonitrile copolymer solution in the methyl ethyl ketone and xylene is a transparently clear coating lacquer. Application of single coatings of this lacquer over metal surfaces, especially non-ferrous metals as copper, brass, bronze, as well as over iron, steel and ferrous metal surfaces, after evaporation of the solvents and without subsequent baking, left them with a strongly adhesive clear transparent continuous thin film which protected and preserved their bright clean original surfaces from atmospheric change for long extended periods, such as even a couple of years or more as with the copper.

Other variations and applications of the coating lacquer of this example occur further below.

While the styrene and acrylonitrile are used in the foregoing example in the ratio of about 5 parts of styrene to one of acrylonitrile, their ratios can be varied. For example, the acrylonitrile may be reduced possibly to even half of its proportion. Alternatively, the acrylonitrile may be increased toward equal to the styrene and also can exceed it even to about five times the styrene. However, as the acrylonitrile ratio is increased up to about equal the styrene, to avoid turbidity or other evidence of inadequate acrylonitrile solution the xylene ought to be replaced, initially at least in part and otherwise as a whole, by dimethylformamide and/or dimethyl sulfoxide.

It is advantageous generally to retain the azo-bis-diisobutyronitrile catalyst. However, the benzoyl peroxide catalyst may be entirely omitted or replaced in part or as a whole by cumene hydroperoxide and/or tertiary-butyl hydroperoxide or di-(tertiary)butyl hydroperoxide, or any other free-radical type catalyst suitable to the polymerization conditions used.

While for certain applications of a coating lacquer formulation like that of Example 3, such as the above-mentioned protective coating of metal surfaces, the plasticizer may be omitted, in other applications only tricresyl phosphate was used in a proportion equal to that of both of the plasticizers in that formulation. However, in working with this modification for some other uses, the tricresyl phosphate indicated tendency of bleeding or migration. This there undesirable tendency was avoided when the tricresyl phosphate was replaced up to, say, about 50% by a plasticizer such as butyl benzyl phthallate or dioctyl phthallate and the like. Their joint use was found to provide a more stable and higher gloss to the finished film than that obtained with tricresyl phosphate alone.

The methyl ethyl ketone could be used alone without xylol, but the latter and/or toluene reduces the cost by up to possibly as much as 60%. That ketone also could be replaced in part or as a whole by any other suitable ketone solvent such as methyl isobutyl ketone, diethyl ketone, diisobutyl ketone, ethyl butyl ketone, methyl n-amyl ketone, methyl isoamyl ketone, or methyl propyl ketone, depending on the various drying conditions. Such other variations in the Example 3 formulation provide other transparent coating lacquers with corresponding variations in properties.

A further variation of the provision of the possibility of doing solution co-polymerization of styrene and acrylonitrile and including another polymerizable substance is shown by, but not restricted to, the following illustrative also of a pigmented coating:

EXAMPLE 4

Pigmented coating based on styrene, acrylonitrile, styrene-butadiene, and equimolar acid addition salt 8 pounds of the equimolar acid addition salt of the U.S. Pat. No. 3,950,348 Example 1, 72 lbs. of styrene, 16 lbs. of acrylonitrile, 30 lbs. of 10% GRS 1006 rubber solution, 16 lbs. of tetrahydrofuran, 9 gallons of xylene, 8 gallons of methyl ethyl ketone, 13 lbs. of 4-methoxy-4-methyl-pentanone-2, 13 lbs. of 'Cyclosol No. 53' (Shell Chemical Company's mixed solvent aromatics), 6 lbs. of mineral oil (medium) USP, 6 lbs. tricresyl phosphate, 6 lbs. butyl benzyl phthallate, 80 lbs. titanium dioxide (pigment RA51, Titanium Corp'n of America), 10 lbs. 'Opti-White' (Burgess Pigment Corp'n, Sandersville, Ga.) anhydrous aluminum silicate, 180 grams azo-bis-isobutyronitrile, 4.5 grams benzoyl peroxide, 4.5 grams di-(tertiary)butyl catechol, 4.5 grams of trinonyl phosphite, 360 grams of lecithin (syrup), and 110 lbs. of flintstone grinding pebbles are loaded into a cylindrical pressure reactor having a bolted on cap on each end, with its longitudinal axis being about three times its diameter.

This reactor is removably mounted for rotation about an axis diametrically normal to the middle of its longitudinal axis, and rotatably supported by its rotation shaft extending diametrically oppositely outwardly from the cylinder wall of the reactor and along its axis of rotation. As so mounted and submerged in a water tank maintained at a polymerization temperature of 174° F. (79° C.) (±2.5° F.), the reactor is rotated slowly (e.g. 3 rpm) for a time sufficient for the conversion to be completed—18 hours.

The rotation then is interrupted and there is added 3 gallons of an epoxy resin solution composed of 32 lbs. of 'Epon 1001' and 4 lbs. of 'Epon 828' (both epoxy resins of Shell Chemical Co., New York, N.Y.), 70 lbs. each of xylene and tetrahydrofuran and a half gallon dimethylformamide, and resumed for long enough (25 minutes or so) to affect their uniform admixture.

The product as thus completed is effective as an advantageous quick-drying final coating for various applications to provide high hiding power, flexibility, strong adhesion and abrasion resistance, with extensive corrosion and weather resistance. For other applications it is diluted with compatible solvents, such as equal parts (by weight) of xylene and methyl ethyl ketone, to provide the specifically suitable viscosity for the use, for example 20 seconds Zahn cup.

These pigmented co-polymerized styrene-acrylonitrile coatings are not to be restricted to the exact formulation of Example 4. Variations in its monomers, solvents, catalyst, plasticizer, antioxidant, and diluents can be made as described in relation to Example 3. Other compatibly suitable white or other color pigments, e.g. aluminum and/or also zinc powders, or the wide range of the different iron oxide pigments can replace the titanium dioxide in part or as a whole.

The lecithin provided a significant and stable plasticizing effect on these pigment-bearing polymers prepared with styrene in addition to enhancing wetting of the pigment by the organic polymer and solvent system and providing improved pigment dispersion and stability of particle distribution.

In the process as in Example 1 the azo-bis-isobutyronitrile can be replaced in part or as a whole by any other of the applicable free-radical type polymerization catalysts (such as noted on page 11 lines 8-12 above). Then too, after the batch temperature reaches the level at which the acid addition salt monomer dissolves in the pentane or other aliphatic hydrocarbon solvent, e.g. the butane or hexane, the temperature should be raised at least to a level at which the free-radical type catalyst decomposes.

The reaction then is maintained at the higher level at least until the polymerization is substantially complete. That is observed when a somewhat milky haziness in the polymerization batch changes to a suspension of the insoluble fine particles of the polymer in the pentane or other such aliphatic hydrocarbon solvent. The quantity of the aliphatic hydrocarbon solvent used should be at least sufficient to dissolve the quantity of acid addition salt monomer at the temperature at which it dissolves in the solvent.

While the invention has been explained with reference to certain specific embodiments of it, it is understood that various substitutions and modifications can be made in the described embodiments within the scope of the appended claims which are intended also to cover equivalents of these embodiments.

What is claimed is:

1. A solid, readily water-soluble, free radical addition polymer of a water-soluble acid addition salt of methacrylic acid and a 2-mono(lower)alkylaminoethyl methacrylate whose lower alkyl group has up to 6 carbons and is straight or branched chain or cyclic, wherein the methacrylic acid and the mono-alkylaminoethyl methacrylate moieties are (i) linked to one another by addition at the respectively original vinyl group of each of them and (ii) present in the ratio of from about 1 mol to about 1.5 mols of one of them per mol of the other, which polymer (a) is insoluble in pentane at below its boiling point, and (b) in aqueous media manifests amphoteric activity.

2. The addition polymer as claimed in claim 1, wherein said methacrylic acid and methacrylate moieties are in equimolar ratio to one another.

3. The addition polymer as claimed in claim 2, wherein said methacrylic acid moiety is that of glacial methacrylic acid.

4. The addition polymer as claimed in claim 2, wherein the methacrylate moiety is that of a 2-(monobutylamino)ethyl methacrylate, and the polymer also is insoluble in butane or hexane below its boiling point and resists fusion at a temperature up to at least about 315° C.

5. The addition polymer as claimed in claim 4, wherein said methacrylate moiety is that of 2-(mono-tertiary-butylamino)ethyl methacrylate.

6. A water-white, transparent, tough and flexible film of the addition polymer as claimed in claim 5.

7. The addition polymer as claimed in claim 1, wherein said methacrylic acid and methacrylate moieties are in unequal-molar ratio to one another.

8. The addition polymer as claimed in claim 7, wherein said methacrylate moiety exceeds said methacrylic acid moiety.

9. The addition polymer as claimed in claim 8, wherein said methacrylate moiety is that of a 2-(monobutylamino)ethyl methacrylate.

10. The addition polymer as claimed in claim 9, wherein said butylaminoethyl methacrylate moiety is that of 2-(mono-tertiary-butylamino)ethyl methacrylate.

11. The addition polymer as claimed in claim 7, wherein said methacrylic acid moiety exceeds said methacrylate moiety.

12. The addition polymer as claimed in claim 11, wherein said methacrylate moiety is that of a 2-(monobutylamino)ethyl methacrylate.

13. The addition polymer as claimed in claim 12, wherein said butylaminoethyl methacrylate moiety is that of 2(mono-tertiary-butylamino)ethyl methacrylate.

14. The method of preparing an addition polymer as claimed in claim 1, which comprises heating a suspension of said solid, water-soluble polymerizable methacrylic acid addition salt of a 2-mono(lower)alkylaminoethyl methacrylate to dissolve in an aliphatic hydrocarbon solvent selected from pentane, hexane or butane in the presence of a said acid addition salt polymerization effective amount of a free-radical type polymerization catalyst; continuing the heating to a temperature at which said catalyst provides its catalytic activity and until the polymerization is substantially complete.

15. An aqueous solution of an equimolar acid addition salt polymer as claimed in claim 2 in any concentration up to fifty percent of said polymer.

16. The method as claimed in claim 14, wherein the methacrylic acid and the 2-mono(lower)alkylaminoethyl methacrylate moieties are present in the ratio of from about 1 mol to about 1.5 mols of one of them per mol of the other.

17. The method as claimed in claim 16, wherein the methacrylic acid and methacrylate moieties are present in equimolar ratio to one another.

18. The method as claimed in claim 17, wherein the methacrylic acid moiety is that of glacial methacrylic acid and the methacrylate moiety is that of a 2-(monobutylamino)ethyl methacrylate.

19. The method as claimed in claim 18, wherein the methacrylate moiety is that of 2-(mono-tertiary-butylamino)ethyl methacrylate.

20. The method as claimed in claim 14, wherein the methacrylic acid and methacrylate moieties are in unequal-molar ratio to one another.

21. The method as claimed in claim 20, wherein the methacrylate moiety content exceeds that of the methacrylic acid moiety.

22. The method as claimed in claim 21, wherein the methacrylate moiety is that of 2-(monobutylamino)ethyl methacrylate.

23. The method as claimed in claim 22, wherein the methacrylic acid moiety is that of glacial methacrylic acid and the methacrylate moiety is that of 2-(mono-tertiary-butylamino)ethyl methacrylate.

24. The method as claimed in claim 14, wherein the methacrylic acid moiety exceeds the methacrylate moiety.

25. The method as claimed in claim 24, wherein the methacrylate moiety is that of a 2-(monobutylamino)ethyl methacrylate.

26. The method as claimed in claim 25, wherein the methacrylic acid moiety is that of glacial methacrylic acid and the methacrylate moiety is that of 2-(mono-tertiary-butylamino)ethyl methacrylate.

* * * * *